(12) United States Patent
Markou et al.

(10) Patent No.: US 9,938,417 B2
(45) Date of Patent: Apr. 10, 2018

(54) FORMULATIONS CONTAINING PIGMENT AND FILLER

(71) Applicants: BASF COATINGS GMBH, Munster (DE); HENKEL AG & CO. KGAA, Dusseldorf (DE)

(72) Inventors: Konstantinos Markou, Cologne (DE); Andreas Niegemeier, Dusseldorf (DE); Sabine Holtschulte, Ascheberg (DE); Jerome Moebius, Kaarst (DE)

(*) Notice: Subject to any disclaimer, the term of this patent is extended or adjusted under 35 U.S.C. 154(b) by 0 days.

(21) Appl. No.: 15/105,250

(22) PCT Filed: Dec. 20, 2013

(86) PCT No.: PCT/EP2013/077686
§ 371 (c)(1),
(2) Date: Jun. 16, 2016

(87) PCT Pub. No.: WO2015/090444
PCT Pub. Date: Jun. 25, 2015

(65) Prior Publication Data
US 2017/0002215 A1    Jan. 5, 2017

(51) Int. Cl.
| | | |
|---|---|---|
| *C09D 5/44* | (2006.01) | |
| *C09D 17/00* | (2006.01) | |
| *C25D 13/06* | (2006.01) | |
| *C25D 13/12* | (2006.01) | |

(52) U.S. Cl.
CPC ......... *C09D 5/4492* (2013.01); *C09D 5/4457* (2013.01); *C09D 5/4488* (2013.01); *C09D 17/001* (2013.01); *C25D 13/06* (2013.01); *C25D 13/12* (2013.01)

(58) Field of Classification Search
CPC .................................................. C09D 5/4492
USPC ........................................................ 428/457
See application file for complete search history.

(56) References Cited

U.S. PATENT DOCUMENTS

| | | | |
|---|---|---|---|
| 4,225,407 A | 9/1980 | Wagener et al. | |
| 4,818,435 A | 4/1989 | Lukacs, III | |
| 2017/0002213 A1* | 1/2017 | Markou ............... | C09D 17/004 |

FOREIGN PATENT DOCUMENTS

| | | | |
|---|---|---|---|
| CN | 101041624 A | 9/2007 | |
| CN | 102382504 A | 3/2012 | |
| GB | 2296204 A | 6/1996 | |
| JP | S63243169 A | 10/1988 | |
| JP | H04215830 A | 8/1992 | |
| JP | H05117573 A | 5/1993 | |
| JP | H0925448 A | 1/1997 | |
| JP | H0978290 A | 3/1997 | |
| WO | 2013092088 A2 | 6/2013 | |
| WO | WO 2015090444 * | 6/2015 | ........... C09D 5/4488 |

OTHER PUBLICATIONS

International Search Report, Dated Aug. 5, 2014; Six (6) Pages.
Office Action dated Aug. 1, 2017 in corresponding Japanese Patent Application No. 2016-559508.

* cited by examiner

*Primary Examiner* — Terressa Boykin
(74) *Attorney, Agent, or Firm* — Dickinson Wright PLLC

(57) ABSTRACT

The invention relates to pigment- and/or filler-containing formulations, comprising one or more solids selected from the group of the pigments and fillers, and an emulsifier (EQ), which has the following formula: $R^1—N\oplus(R^2)(R^3)(R^4)X\ominus$ (EQ), where: $R^1$ is a moiety that contains at least one aromatic group and at least one aliphatic group, has 15 to 40 carbon atoms, and contains at least one functional group selected from hydroxy groups, thiol groups, and primary or secondary amino groups and/or comprises at least one carbon-carbon multiple bond; $R^2$, $R^3$, and $R^4$ are, independently of each other, identical or different aliphatic moieties having 1 to 14 carbon atoms; and $X\ominus$ stands for the acid anion of an organic or inorganic acid HX. The invention further relates to coating agents comprising said formulations, the use of said formulations to produce electrocoats, and conductive substrates coated with said coating agent compositions.

27 Claims, No Drawings

FORMULATIONS CONTAINING PIGMENT AND FILLER

The present invention relates to pigment- and/or filler-containing formulations, with the use of special emulsifiers. The present invention also relates to the formulations obtainable by said method, and use thereof.

It is common in coating agent manufacturing to produce pigmented and/or filler-containing lacquer systems with the use of so-called pigment pastes or filler pastes, which contain pigments predispersed at high concentration. The predispersion here is typically performed with the use of polymeric binders, which are to wet the pigment surfaces on one hand and must have favorable compatibility with the lacquer systems in which the pastes are later used. Ideally, the binders that are used to produce the pigment and/or filler preparation correspond to or contain the main binders of the lacquer systems in which they are used.

In many cases, however, the main binders of the pigmented and/or filler-containing lacquer systems are unsuitable for de-aggregating the pigments and/or fillers effectively and preventing reagglomeration. In such cases, it is recommended to use so-called grinding resins in the manufacture of the pigment and/or filler preparations. For example, amine-modified aromatic epoxy resins, which are frequently used as main binder in the manufacture of electrocoats, are less suitable—with respect to the wetting properties thereof—for wetting pigment and/or filler surfaces. Usually, special grinding resins are thus used here. Though these can also be obtained by modifying epoxy compounds with amines, it is necessary to incorporate molecular building blocks that can undergo particularly favorable interaction with the pigment and/or filler surfaces.

In cathodically depositable electrocoats, aqueous dispersions based on epoxy amine resins are usually used as main binder. In some cases, however, amine-functionalized acrylate resins may be used as well.

Thus, as an example, WO 82/00148 disclose producing cathodically depositable primary dispersions with the use of cationically adjustable emulsifiers. The emulsifiers may bear reactive groups by which they can be integrated into the polymeric resin system in the cross-linking reaction. Explicitly-cited examples of emulsifiers are the acetic acid salts of fatty mono- and diamines, such as primary tallow amines and oleylamines or the acetic acid salts of tallow amines and oleylamines. Tallow amines and oleylamines contain hydrocarbon chains having at least one carbon-carbon double bond. Polymeric emulsifiers may also be used, such as, for example, an epoxy phenolic adduct, which has been reacted with diethanolamine and cationically adjusted with acetic acid. Some embodiments of WO 82/00148 use Ethoduomeen™ T13, which constitutes a tertiary amine having an unsaturated alkyl moiety, as a co-emulsifier. The manufacturer, Akzo Nobel, indicates that this involves N',N', N-Tris-(2-hydroxyethyl)-N-tallowyl-1,3-diaminopropane. WO 82/00148 teaches that the cationically adjusted emulsifiers are the only cationic components of the resin system. The primary dispersions of WO 82/00148 can also be called "miniemulsions".

Miniemulsions are dispersions of water, an oil phase, and one or more surface-active substances, wherein the dispersed particles have a mean particle diameter of 5 to 500 nm, preferably 25 to 500 nm, and particularly preferably 50 to 500 nm. Miniemulsions are regarded as metastable (cf. Emulsion Polymerization and Emulsion Polymers, Editoren. P. A. Lovell and Mohamed S. El-Aasser, John Wiley and Sons, Chichester, N.Y., Weinheim, 1997, pp. 700ff; Mohamed S. El-Aasser, Advances in Emulsion Polymerization and Latex Technology, 30th Annual Short Course, Volume 3, Jun. 7-11, 1999, Emulsion Polymers Institute, Lehigh University, Bethlehem, Pa., U.S.A.). So-called miniemulsions are widely used in the art, for example, in detergents, cosmetics, or personal care products, but also coating agent compositions such as, for example, electrocoats.

The manufacture of aqueous primary dispersions with the aid of miniemulsion polymerization is disclosed in, for example, international patent applications WO 82/00148 and WO 98/02466, or German patent applications DE 196 28 143 A1 and DE 196 28 142 A2. This known methods allow for the monomers to be copolymerized in the presence of different low-molecular, oligomeric, or polymeric hydrophobic substances of costabilizers (cf. DE 196 28 142 A2). In addition, hydrophobic, organic adjuvants that are poorly soluble in water, such as, for example, plasticizers can be incorporated into the monomer droplets of the miniemulsion, as can film-forming aids such as, for example, coalescents or other such organic additives (cf. DE 196 28 143 A1). WO 82/00148 describes, for example, the use of emulators to stabilize the emulsions disclosed therein.

In a study by Grabs and Schmidt-Naake (Macromol. Symp. 2009, 275-276, S133-141), miniemulsions made of 2-aminoethyl methacrylate hydrochloride and styrene, butyl acrylate, and/or butyl methacrylate are produced and polymerized in-situ, wherein there occur resin particles that bear a positive surface charge due to the positive charge of the aminoethyl methacrylate monomer, and are thereby stabilized in the dispersion. Saturated cetyltrimethylammonium bromide, which has a quaternary N atom and therefore bears a permanent positive charge, can be used as a cationic co-emulsifier in the manufacture of the dispersion. The positive charge is compensated by halide anions in both cases.

The present invention addresses the problem of providing pigment- and/or filler-containing formulations that can be produced with a variety of grinding resins. The pigment- and/or filler-containing formulations obtainable according to the present invention are intended to be usable in aqueous coating agent compositions, which are to have an improvement in long-term stability. The aqueous coating agents produced therefrom are also intended to have better film formation properties, so as to be more broadly applicable than has previously been possible.

The present invention also addresses the problem of providing an aqueous preparation that contains the pigment- and/or filler-containing formulation of the present invention and can be used, in particular, in the field of electrocoating as a coating agent, in order to improve the film formation of the electrocoats and achieve enhanced corrosion protection for metallic substrates—in particular, aluminum substrates.

The problems of the present invention are solved by providing a pigment- and/or filler-containing formulation, comprising one or more solids selected from the group of the pigments and fillers, and an emulsifier (EQ), which has the following formula:

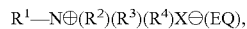

where:
R$^1$ is a moiety that contains at least one aromatic group and at least one aliphatic group, has 15 to 40 carbon atoms, and contains at least one functional group selected from hydroxy groups, thiol groups, and primary or secondary amino groups and/or comprises at least one carbon-carbon multiple bond;

$R^2$, $R^3$, and $R^4$ are, independently of each other, identical or different aliphatic moieties having 1 to 14 carbon atoms; and $X\ominus$ stands for the acid anion of an organic or inorganic acid HX.

Pigment- and/or filler-containing formulations in the sense of this invention are often also called pigment preparations, pigment pastes, or ground material in the literature.

With a view to the prior art, it is surprising and could not have been anticipated by a person skilled in the art that the problems addressed by the present invention can be solved by the pigment- and/or filler-containing formulations according to the invention. It is particularly surprising that the emulsifier (EQ) to be used according to the invention is most significantly responsible for the improved properties of the pigment- and/or filler-containing formulations and the aqueous preparations that can be produced therefrom.

Emulsifier (EQ)

The emulsifier (EQ) used herein has the general formula:

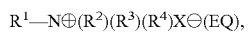

$$R^1—N\oplus(R^2)(R^3)(R^4)X\ominus (EQ),$$

where:
$R^1$ is a moiety that contains at least one aromatic group and at least one aliphatic group, has 15 to 40 carbon atoms, and contains at least one functional group selected from hydroxy groups, thiol groups, and primary or secondary amino groups and/or comprises at least one carbon-carbon multiple bond;

$R^2$, $R^3$, and $R^4$ are, independently of each other, identical or different aliphatic moieties having 1 to 14 carbon atoms; and $X\ominus$ stands for the acid anion of an organic or inorganic acid HX.

A carbon-carbon multiple bond is to be understood herein to be a carbon-carbon double bond or a carbon-carbon triple bond. Preferably, the carbon-carbon multiple bond entails a carbon-carbon double bond.

Preferably, the moiety R1 has an aromatic group Grarom and two aliphatic groups Grali1 and Grali2 that are bonded to Grarom. Particularly preferably, the moiety R1— has the structure Grali1-Grarom-Grali2.

Preferably, the moiety R1 has at least one carbon-carbon multiple bond, particularly preferably at least one carbon-carbon double bond, in the at least one aliphatic group $Gr_{ali1}$. The presence of carbon-carbon multiple bonds—in particular, carbon-carbon double bonds—has a positive effect on the shear stability of the dispersions and coating agents produced with the use of the emulsifiers. In particular, undesired migration of the emulsifiers in the dispersions and coating agent composition can be prevented or reduced. Particularly preferably, the moiety $R^1$ contains one to three carbon-carbon double bonds in the at least one aliphatic group $Gr_{ali1}$.

Very especially preferably, the moiety $R_1$ contains at least one carbon-carbon multiple bond—in particular, at least one carbon-carbon double bond, preferably one to three carbon-carbon double bonds—in the at least one aliphatic group $Gr_{ali1}$, and additionally at least one functional group selected from hydroxy groups, thiol groups, and primary or secondary amino groups in a second aliphatic group $Gr_{ali2}$ that is different from the aforementioned aliphatic group $Gr_{ali1}$. Hydroxy groups, thiol groups, and primary or secondary amino groups endow the emulsifier with reactivity to cross-linkers that are typical in lacquers, such as, for example, blocked or unblocked polyisocyanates, aminoplast resins such as, for example, melamine-formaldehyde resins, tris (alkoxycarbonylamino) triazines, which are different from the aforementioned cross-linkers, or even resins that contain epoxy groups. Dispersions containing such emulsifiers that bear hydroxy groups, thiol groups, and/or primary or secondary amino groups can thus be chemically incorporated into the coating agent during the curing process of a coating agent produced with the aid of the formulation according to the invention, whereby undesired migration of the emulsifier can be prevented or reduced.

The at least one aliphatic group $Gr_{ali1}$ in the moiety $R^1$, which bears at least one carbon-carbon double bond, may be linear or branched, but is preferably linear. The at least one aliphatic group $Gr_{ali1}$ in the moiety $R^1$ may also be substituted or unsubstituted, but is preferably unsubstituted. In addition, this aliphatic group may contain heteroatoms selected from the group consisting of O, S, and N, but is preferably heteroatom-free. This aliphatic group in the moiety $R^1$ is therefore particularly preferably linear, unsubstituted, and heteroatom-free, and contains one to three double bonds. Preferably, the group $Gr_{ali1}$ contains 8 to 30, particularly preferably 10 to 22, and very particularly preferably 12 to 18 carbon atoms—for example, 15 carbon atoms.

The at least one aliphatic group $Gr_{ali2}$ in the moiety $R^1$, which bears at least one functional group selected from hydroxy groups, thiol groups, and primary or secondary amino groups, among which OH groups are particularly preferable, and which is different from $Gr_{ali1}$, may be linear or branched but is preferably linear. The at least one aliphatic group $Gr_{ali2}$ in the moiety $R^1$ may also be substituted or unsubstituted, but is preferably unsubstituted. In addition, this aliphatic group may contain heteroatoms selected from the group consisting of O, S, and N, among which O is preferable. The aliphatic group $Gr_{ali2}$ is preferably directly bonded to the nitrogen atom appearing in the above general formula of the emulsifier (EQ). Any mention here of the "nitrogen atom in the general formula of the emulsifier (EQ) according to the invention" refers to the positively charged nitrogen bonded to the moieties $R^1$, $R^2$, $R^3$, and $R^4$. Preferably, the at least one functional group selected from hydroxy groups, thiol groups, and primary or secondary amino groups is in the beta position to the nitrogen atom of the above general formula of the emulsifier (EQ). A special advantage of the present emulsifiers (EQ) is the permanent positive charge of the nitrogen atom in the general formula of the emulsifier according to the invention. As a result, the permanently positive charge makes it possible to further enhance the dispersion stability and storage stability of such pigment- and/or filler-containing formulations according to the invention or coating agent compositions produced therefrom, and to prevent an amine-catalyzed reaction.

Another advantage of such emulsifiers (EQ) in which a hydroxy group, thiol group, or primary or secondary amino group is in the beta position to the nitrogen atom of the emulsifier of the general formula (EQ) lies in the possibility of forming chelates with metal ions, which is advantageous when the pigment- and/or filler-containing formulations according to the invention are used specifically in coating agent compositions from which metal ions are to be deposited. Correspondingly chelated metal ions provide an improved deposition and can enhance the corrosion protection effect of such coatings. Very particularly preferably, a hydroxy group is in the beta position to said nitrogen atom. Preferably, the group $Gr_{ali2}$ contains 2 to 10, particularly preferably 2 to 8, and very particularly preferably 2 to 6 carbon atoms—for example, 2 or 3 carbon atoms.

The aromatic group $Gr_{arom}$ in the moiety $R^1$ is preferably a phenylene or naphthylene group, preferably a phenylene group. The aromatic group $Gr_{arom}$ may be substituted or unsubstituted, but is preferably unsubstituted. The aromatic group $Gr_{arom}$ may contain heteroatoms selected from the group consisting of O, S, and N, but is preferably heteroatom-free. Preferably, the group $Gr_{arom}$ contains 6 to 15, particularly preferably 6 to 12, and very particularly preferably 6 to 10 carbon atoms—for example, 6 carbon atoms.

Particularly preferable is a moiety ($R^1$—) of the formula:

$$Gr_{ali1}\text{-}Gr_{arom}\text{-}Gr_{ali2}\text{-}$$

where:
$Gr_{ali1}$ is linear, unsubstituted, and heteroatom-free, and has one to three—preferably one or two—double bonds;
$Gr_{arom}$ is a phenylene or naphthylene group; and
$Gr_{ali2}$ is linear, bears a hydroxy group, preferably in the beta position to the nitrogen atom in the general formula of the emulsifier (EQ), and additionally contains O as a heteroatom, in the form of an ether group, wherein preferably
in the case where $Gr_{arom}$ is a phenylene group, the groups $Gr_{ali1}$ and $Gr_{ali2}$ are bonded to the phenylene group in the meta position to one another.

The moieties $R^2$, $R^3$, and $R^4$ stand, independently of one another, for identical or different aliphatic moieties having 1 to 14, preferably 2 to 10, particularly preferably 2 to 8 carbon atoms. If $R^1$ does not contain a functional group selected from hydroxy groups, thiol groups, and primary or secondary amino groups, then it is particularly advantageous if at least one of the moieties $R^2$, $R^3$, and $R^4$ bears such a functional group. Very particularly preferably, at least two of the moieties $R^2$, $R^3$, and $R^4$ bear at functional group selected from hydroxy groups, thiol groups, and primary or secondary amino groups. Thereamong, hydroxy groups are very particularly preferable. Particularly preferably, said functional group is terminal in the moieties $R^2$, $R^3$, and $R^4$, but non-terminal in the moiety $R^1$.

The moieties $R^2$, $R^3$, and $R^4$ may then be linear or branched, but are preferably linear. $R^2$, $R^3$, and $R^4$ may bear carbon-carbon multiple bonds, but are preferably saturated.

Preferably, in addition to the above-mentioned hydroxy, thiol, and primary and secondary amino groups, the aliphatic moieties $R^2$, $R^3$, and/or $R^4$ contain at least one more—preferably exactly one more—functional group selected from ether groups, ester groups, and amide groups. The ether oxygen, the —O— of the —O—C(=O) group, and the amide nitrogen of the amide group are preferably in the beta position to the nitrogen atom of the general formula of the emulsifier (EQ).

In the emulsifiers (EQ), the anion $X\ominus$ is the acid anion of an organic or inorganic acid HX, preferably excluding halides. Particularly preferably, this entails the anion of a monocarboxylic acid, such as, for example, the monocarboxylic acids used in the neutralization of cathodic electrocoat resins. Suitable anions of monocarboxylic acids are preferably those having 1 to 10 carbon atoms, such as, for example, formates, acetates, or lactates. Particularly preferably, $X\ominus$ stands for anions of hydroxycarboxylic acids, in particular, for lactate.

In a particularly preferred embodiment of the present invention, the emulsifier (EQ) entails one such as is represented in the following formula:

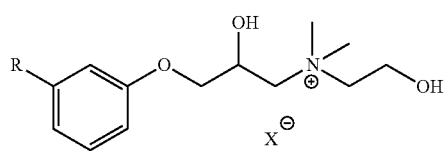

where R stands for $C_{15}H_{31-2n}$ and $X\ominus$ stands for lactate or other anions of organic acids, and wherein n may=0 to 3, i.e., the moiety R may have 0 to 3 carbon-carbon double bonds. This compound is, for example, obtainable by adding N,N-dimethylethanolamine lactate to a cardanol glycidyl ether of the formula

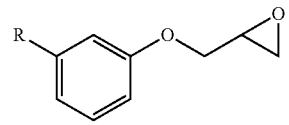

with R for $C_{15}H_{31-2n}$ and n=0 to 3, and thereupon opening the oxirane ring.

Starting from the cardanol glycidyl ether, it is possible to produce, for example, a variety of preferred emulsifiers according to the invention by adding an ammonium salt of the general formula $HN\oplus(R^2)(R^3)(R^4)(X\ominus)$ to the oxirane ring. Herein, the moieties $R^2$, $R^3$, and $R^4$ and $X\ominus$ possess the meanings specified above.

The starting material for producing a cardanol glycidyl ether is the naturally occurring substance cardanol, which has the following formula

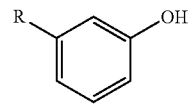

with R for $C_{15}H_{31-2n}$ and n=0 to 3. As is known from the chemistry of natural products, especially the chemistry of naturally occurring fats and oils and derived products thereof, these substances generally exist as a mixture of individual compounds having a different number of carbon-carbon double bonds. The natural product cardanol is one such mixture, with which the individual components differ in the number of the double bonds in the R chain. The most common individual components contain 0 to 3 double bonds. To produce the cardanol glycidyl ether, cardanol is reacted, for example, with epichlorohydrin.

For all embodiments of the pigment- and/or filler-containing formulations according to the invention, it is the case that not only one emulsifier (EQ) but even a mixture of a plurality of emulsifiers (EQ) can be used. Particularly preferable thereamong are those mixtures with which a portion of the emulsifiers bear carbon-carbon multiple bonds in the moiety $R^1$ and another portion does not contain carbon-carbon multiple bonds in the moiety $R^1$. When emulsifier mixtures of a plurality of emulsifiers (EQ) are used, preferably more than 50 mol %, particularly preferably more than 70 mol % of the moieties $R^1$ contain carbon-carbon multiple bonds, wherein carbon-carbon double bonds are particularly preferable. For the above-mentioned cardanol derivatives, this means that in the moiety $R=C_{15}H_{31-2n}$, preferably n=1 to 3 in more than 50 mol %, particularly preferably more than 70 mol % of the moieties R, and n=0 in the remaining moieties R. It is also possible, however, to use emulsifier mixtures that are composed only of those emulsifiers (EQ) with which n=1 to 3, or those with which n=0.

In the pigment- and/or filler-containing formulation to be used according to the invention, the emulsifiers (EQ) are preferably in an amount of 0.5 to 15.0 wt. %, particularly preferably an amount of 1.0 to 10.0 wt. %, and very particularly preferably in an amount of 2.0 to 8.0 wt. %, each based on the weight of one liter of the pigment- and/or filler-containing formulation.

Pigments and Fillers

In principle, all inorganic and organic pigments and fillers can be used as pigments and fillers. The pigments and fillers are usually selected in relation to the intended purpose of the pigment- and/or filler-containing formulation. If the formulation is used, for example, for the pigmentation of cathodic electrocoats, which are known to have an acidic pH value, then, for example, no chalk pigments or chalk fillers (calcium carbonate) are eligible for the formulations, because these would dissolve completely in the acidic medium. However, partial dissolution of pigments in the subsequent coating agent may even be desired if, for example, catalytically active metal ions are slowly and gradually released thereby.

Typical inorganic pigments are: oxide and oxide-hydroxide pigments, such as, for example, titanium dioxide, zinc oxide, iron oxide, and chromium oxide; oxide mixed-phase pigments, such as, for example, bismuth-molybdenum-vanadium-oxide yellow, chromium titanium yellow, spinel blue, iron manganese brown, zinc iron brown, iron manganese black, and spinel black; sulfide and sulfide selenide pigments, such as, for example, zinc sulfide, lithopone, cadmium yellow, and cadmium red; carbonate pigments, such as calcium carbonate (with the above-mentioned technical limitation); chromate and chromate-molybdenum mixed-phase pigments, such as, for example, chrome yellow and molybdenum orange and red; complex salt pigments, such as, for example, iron blue; silicate pigments, such as, for example, aluminum silicate and ultramarine (blue, violet, and red); pigments made from chemical elements, such as, for example, aluminum, copper-zinc alloys, and carbon black; as well as other pigments, such as, for example, barium sulfate.

Typical organic pigments are monoazo pigments, disazo pigments, and polycyclic pigments such as, for example, perylene pigments and phthalocyanine pigments.

Typical inorganic fillers are: silicates, such as, for example, talc and kaolin; silicic acids, such as, for example, precipitated or pyrogenic silicic acids; oxides, such as, for example, aluminum hydroxide or magnesium hydroxide; sulfates, such as, for example, blanc fixe; and calcium sulfates, as well as a variety of carbonates.

Pigments and fillers here also encompass those poorly-soluble compounds that are also able to perform catalytic tasks, in addition to the typical tasks of pigments and fillers. It is thus particularly preferable—in particular, with the use of the pigment- and/or filler-containing formulations to produce electrocoats—for poorly-soluble bismuth compounds that catalyze the cross-linking reaction between the main binder and the cross-linkers to be incorporated as pigments. Typical representatives of poorly-soluble bismuth compounds are, for example, bismuth subnitrate and bismuth subsalicylate. To the aqueous preparations that can be obtained with the use of pigment- and/or filler-containing formulations and that include poorly-soluble bismuth compounds, it is possible to add complexing agents such as, for example, EDTA, bicine, or the like, in order to produce successive soluble bismuth.

A sharp distinction between pigments and fillers is not necessary in the present invention. In practice, the refractive index is often used to make a distinction. Pigments are generally said to have a refractive index above 1.7, whereas fillers have a lower one.

Wetting agents and/or dispersants may also be added to the dispersions in order to achieve a more favorable dispersibility of the pigments and fillers in the dispersions, as may cosolvents, in particular, monoalcohols or glycols.

Polymers

As another component, the pigment- and/or filler-containing formulation according to the invention may very particularly preferably contain polymers (polymeric substances). These polymers then serve as so-called grinding resins. Examples of suitable polymers are polymerization products, polycondensation products, and/or polyaddition products. In particular, it is possible to use polymers that are adapted to the subsequent use of the pigment- and/or filler-containing formulation, in a particular type of coating agent. Thus, it is possible to incorporate, in particular, epoxy amine adducts, such as are usually used in coating agents, in particular, electrocoats. Particular preferable are those epoxy amine adducts that contain quaternary nitrogen atoms; these can be obtained by reacting epoxy groups of the epoxy amine resin with ammonium salts of the general formula $HN\oplus(R^2)(R^3)(R^4)(X\ominus)$— analogously to the production of (EQ). The definitions of the moieties $R^2$, $R^3$, $R^4$, and $X\ominus$ correspond to the definitions for the formula (EQ). Additionally or alternatively to the epoxy amine adducts, it is also possible to use, for example, acrylate resins. Among the acrylate resins, those with quaternary nitrogen atoms are preferable. In principle, any and all polymers known and used as grinding resins may be used.

Cross-Linking Agents (V)

The pigment- and/or filler-containing formulations according to the invention, as well as the aqueous preparations that can be produced with the use thereof, may contain cross-linking agents. In particular, the coating agents that can be produced from the pigment- and/or filler-containing formulations—such as electrocoats, and preferably cathodic electrocoats—contain such cross-linking agents.

Coating materials that can be used very particularly advantageously therefore result when the polymeric grinding resin and the emulsifier (EQ) are mixed in the presence of at least one hydrophobic—i.e., substantially water-insoluble—cross-linking agent (herein also called a cross-linker). In a further development of the pigment- and/or filler-containing formulations, the cross-linking agents may also be mixed with the pigment- and/or filler-containing formulations at a later time.

Preferably, the substantially water-insoluble cross-linking agents have reactive functional groups that can undergo cross-linking reactions with the functional groups present in the polymeric grinding resins and/or in the emulsifier (EQ) (so-called one-component systems). The resulting pigment- and/or filler-containing formulations contain the cross-linking agents in a particularly favorable distribution, causing the cross-linking reactions to later run particularly favorably in the coating agents, so that less cross-linking agent can be used than in the corresponding dispersions that have been manufactured according to methods of the prior art.

Examples of particularly suitable hydrophobic—i.e., substantially water-insoluble—cross-linking agents are blocked polyisocyanates, tris(alkoxycarbonylamino) triazines, or aminoplast resins; blocked polyisocyanates are very particularly suitable.

Blocked Polyisocyanates

Examples of suitable organic polyisocyanates to be blocked are, in particular, the so-called lacquer polyisocyanates having aliphatically, cycloaliphatically, araliphatically, and/or aromatically bonded isocyanate groups. It is preferable to use polyisocyanates having an average of 2 to 5, particularly preferably 2.5 to 5 isocyanate groups per molecule.

Examples of particularly suitable polyisocyanates to be blocked are polyisocyanates having isocyanurate, biuret, allophanate, iminooxadiazindione, urethane, urea, and/or uretdione groups.

Polyisocyanates having urethane groups are obtained, for example, by reacting a part of the isocyanate groups with polyols such as, for example, trimethylolpropane and glycerol. If, for example, trimethylolpropane is reacted with 3 equivalents of a diisocyanate, the result is essentially a triisocyanate.

To produce the polyisocyanates to be blocked, it is preferable to use: aliphatic or cycloaliphatic diisocyanates, in particular, hexamethylene diisocyanate, isophorone diisocyanate, dicyclohexylmethane-2,4'-diisocyanate, dicyclohexylmethane-4,4'-diisocyanate, diphenylmethane-2,4'-diisocyanate, diphenylmethane-4,4'-diisocyanate, toluene-2,4-diisocyanate, and toluene-2,6-diisocyanate; diisocyanates derived from dimer fatty acids, such as are marked by the company Henkel under the trade name DDI 1410 and are described in patent documents WO 97/49745 and WO 97/49747, in particular, 2-heptyl-3,4-bis (9-isocyanatononyl)-1-pentyl-cyclohexane; or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane, or 1,2-, 1,4- or 1,3-Bis(4-isocyanatobut-1-yl)cyclohexane, 1,8-diisocyanato-4-isocyanatomethyl-octane, 1,7-diisocyanato-4-isocyanatomethylheptane, or 1-isocyanato-2-(3-isocyanatopropyl)cyclohexane, or mixtures thereof.

The diisocyanates may also be used as such to produce blocked diisocyanates. Preferably, however, they are not used alone, but rather in the mixture with the polyisocyanates that have on average more than two isocyanate groups.

Very particularly preferable are mixtures of uretdione and/or isocyanurate group- and/or allophanate group-having polyisocyanates based on diphenylmethane-2,4'-diisocyanate, diphenylmethane-4,4'-diisocyanate, toluene-2,4-diisocyanate, and/or toluene-2,6-diisocyanate, as well as the adducts of the above diisocyanates with polyols, in particular, triols, such as, for example, trimethylolpropane and glycerol.

Examples of suitable blocking agents for producing the blocked diisocyanates or polyisocyanates are the blocking agents disclosed in US patent document U.S. Pat. No. 4,444,954, such as, for example:

b1) phenols, such as phenol, cresol, xylenol, nitrophenol, chlorophenol, ethyl phenol, t-butylphenol, hydroxybenzoic acid, hydroxybenzoic acid esters, or 2,5-di-t-butyl-4-hydroxy toluene;

b2) lactams, such as ε-caprolactam, δ-valerolactam, γ-butyrolactam, or β-propiolactam;

b3) active methylene compounds, such as diethyl malonate, dimethyl malonate, ethyl acetoacetate, methyl acetoacetate, or acetyl acetone;

b4) alcohols, such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, butyl diglycol, propylene glycol, diethylene glycol monomethyl ether, diethylene glycol monoethyl ether, propylene glycol monomethyl ether, methoxymethanol, glycolic acid, glycolic acid esters, lactic acid, lactic acid esters, methylol urea, methylol melamine, diacetone alcohol, ethylene chlorohydrine, ethylene bromohydrine, 1,3-dichloro-2-propanol, 1,4-cyclohexyldimethanol, or acetocyanhydrine;

b5) mercaptans, such as butyl mercaptan, hexyl mercaptan, t-butyl mercaptan, t-dodecyl mercaptan, 2-mercapto-benzothiazole, thiophenol, methyl thiophenol, or ethyl thiophenol;

b6) acid amides, such as acetoanilide, acetoanisidine amide, acrylamide, methacrylamide, acetic amide, stearic amide, or benzamide;

b7) imides, such as succinimide, phthalimide, or maleimide;

b8) amines, such as diphenylamine, phenylnaphthylamine, xylidine, N-phenyl xylidine, carbazole, aniline, naphthylamine, butylamine, dibutylamine, or butyl phenylamine;

b9) imidazoles, such as imidazole or 2-ethylimidazole;

b10) ureas, such as urea, thiourea, ethylene urea, ethylene thiourea, or 1,3-diphenyl urea;

b11) carbamates, such as N-phenyl carbamic acid phenyl ester or 2-oxazolidone;

b12) imines, such as ethylene imine;

b13) oximes, such as formaldoxime, acetaldoxime, acetoxime, methylethyl ketoxime, diisobutyl ketoxime, diacetylmonoxime, benzophenonoxime, or chlorohexanonoxime;

b14) sulfurous acid salts, such as sodium bisulfite or potassium bisulfite;

b15) hydroxamic acid esters, such as benzyl methacrylo hydroxamate (BMH) or allyl methacrylo hydroxamate;

b16) substituted pyrazoles, in particular, dimethylpyrazole or triazole; and b17) mixtures of the above-mentioned blocking agents.

Aminoplast Resins

Examples of suitable, fully etherified aminoplast resins are melamine resins, guanamine resins, or urea resins. Also applicable are the usual and known aminoplast resins in which methylol and/or methoxymethyl groups have been partially defunctionalized by means of carbamate or allophanate groups. Cross-linking agents of this type are described in patent documents U.S. Pat. No. 4,710,542 A1 and EP 0 245 700 B1, as well as in the article by B. Singh et al. "Carbamylmethylated Melamines, Novel Crosslinkers for the Coatings Industry" in Advanced Organic Coatings Science and Technology Series, 1991, vol. 13, pp. 193-207.

Tris(alkoxycarbonylamino) triazines

Suitable tris(alkoxycarbonylamino) triazines are described, for example, in patent documents U.S. Pat. No. 4,939,213 A1, U.S. Pat. No. 5,084,541 A1, or EP 0624577 A1. In particular, tris (methoxy-, tris(butoxy-, and/or tris(2-ethylhexoxycarbonylamino) triazines may be used. From the above-described cross-linking agents, the blocked polyisocyanates offer special advantages and are therefore very particularly preferably used according to the invention.

Dispersing the Pigment- and/or Filler-Containing Formulation

In the pigment- and/or filler-containing formulations, the pigments and/or fillers are mixed with the emulsifier (EQ) and preferably with the polymer acting as a grinding resin. The mixing is accompanied by dispersion of the pigments and/or fillers and has the aim of obtaining dispersions that have the highest possible proportion of pigment and/or filler primary particles.

The mixing thus serves to largely homogeneously disperse the pigments and/or fillers. Simply stirring then destroys so-called conglomerates, i.e., loose conglomerations of pigment and/or filler agglomerates. Breaking up the agglomerates, i.e., spatially cohering pigment and/or filler aggregates, often requires higher shear forces. The aggregates, which are made of pigment primary particles that cohere tightly together due to surface forces, are in turn generally only crushed by strong shear forces. The aim of the dispersion process is to disperse the pigments and/or fillers used to the extent that the highest possible proportion of primary particles, i.e., individual pigment particles is produced. A graphic comparison of primary particles, aggregates, and agglomerates can be found, for example, in DIN 53206 (sheet 1). The term "crushing"—as used herein—is to break up conglomerates, agglomerates, and/or aggregates, rather than further crushing of primary particles.

In order to mix and disperse the pigments and/or fillers in the gentlest manner possible, it is common to perform a multi-stage mixing with the application of ever-higher shear forces.

It is advisable to first mix the dispersion with the solids to be incorporated, in particular, the pigments and/or fillers, by simple stirring. In an advantageous embodiment, one or more adjuvants—in particular, wetting agents and/or dispersants that are different from the emulsifier (EQ), and/or organic solvents—may be added to the dispersion before or during the stirring. There are a number of solvents that promote the dispersion; these include, in particular, monoalcohols and glycols. Wetting agents are successfully used, in particular, with some poorly-wettable organic pigments.

Preferably, there is a subsequent predispersion by means of a so-called dissolver, which herein entails high-speed disc agitators. The predispersion typically serves to achieve higher throughput for the ensuing main dispersing aggregates. With readily-dispersible pigments, such as, for example, titanium dioxide pigments, however, a predispersion may be omitted entirely. The predispersion turns coarsely-dispersed systems into so-called colloidal dispersed systems, which are characterized in that the solid particles do not settle under the influence of gravity, due to the small size thereof. The predispersion involves wetting of the surface of the solid particles, through the liquid medium, and a partial mechanical crushing of the conglomerates, agglomerates, and aggregates into smaller particles. The preferred use of wetting agents and/or dispersants during the predispersion also results in stabilization of the smaller particles against reagglomeration.

Dissolvers can be used not only for predispersion, but also to incorporate matting agents at lower shear rates, or—in some cases—for the main dispersion at higher shear rates.

Typical operational data for incorporating matting agents are circumferential speeds of 10 to 20 m/s, such as, for example, 16 m/s, with dispersion times of 5 to 10 min and temperatures from room temperature (25° C.) to 35°. The circumferential speed is calculated from the disc circumference of the disc agitator, and the number of revolutions per unit time. Common circumferential speeds for the predispersion lie about 5 m/s higher, at 15 to 25 m/s, such as, for example, 21 m/s, with dispersion times of 10 to 20 min and temperatures in the range of 35° C. to 50° C. If dissolvers are also used for the main dispersion, then the circumferential speeds lie again about 5 m/s higher than with the predispersion, for example, in a range from 20 to 30 m/s, such as, for example, 25 m/s, with dispersion times in the range of 20 to 40 min and temperatures in the range of 50° C. to 70° C. The above-mentioned values may be viewed as a general guide; the ranges preferably apply for batch sizes of 500 to 1000 kg.

Different types of dissolvers are described in detail with the corresponding typical operational data therefor in the laboratory "Lehrbuch der Lacke und Beschichtungen", vol. 8, 2004, pp. 47-50.

For particularly high-quality color-pigmented lacquers, dispersion with a dissolver is not necessarily sufficient in all cases. The main dispersion is then performed, for example, in so-called triple rollers, bead mills, or agitator mills. Bead mills and especially agitator mills are particularly suitable thereamong. All three aforementioned types of mills are described in detail with the corresponding typical operational data therefor in the laboratory "Lehrbuch der Lacke und Beschichtungen", vol. 8, 2004, p. 53ff.

The state of dispersion of the pigment- and/or filler-containing formulations according to the invention can be determined by ascertaining the grindometer value. This entails a simple determination of the fineness of the ground material, wherein the proportion of so-called large grain is measured. The measurement and assessment methods are explained in greater detail in the examples, and correspond to DIN 53203.

Dispersing 100 g of a pigment or filler in a dissolver conventionally requires 30 to 1000 g of binder, depending on the nature of the pigment or filler. Whereas, for example, titanium dioxide disperses very well in small quantities of binders, for example, 40 to 60 g of binder to 100 g of titanium dioxide, dispersing certain silicic acids such as, for example, certain Aerosils requires up to 900 g of binder per 100 g of Aerosil. Relevant information is available in Römpp Lexikon Lacke and Druckfarben, 1998, p. 369, keyword "Mahlgut" ("ground material").

Aqueous Preparations Containing the Pigment- and/or Filler-Containing Formulations Use of the term "aqueous" herein indicates that the volatile fraction—i.e., the fraction of a composition that is volatile in drying at a temperature of 180° C. over 30 min—is preferably more than 50 wt. % water, particularly preferably more than 70 wt. %, and very particularly preferably more than 90 wt. % water.

The pigment- and/or filler-containing formulations according to the invention are used to produce aqueous preparations, in particular, to produce coating materials. Further subject matters of the present invention are thus aqueous preparations, in particular, coating agent compositions, that contain the pigment- and/or filler-containing formulations according to the invention.

The aqueous preparations according to the invention are preferably coating agent compositions, very particularly preferably cathodically depositable electrocoats. For these intended uses, at least one common lacquer additive in effective quantities can be added to the pigment- and/or filler-containing formulations to be used according to the invention, before, during, and/or after the production thereof. A person skilled in the art will be able to identify such lacquer additives, on the basis of common general knowledge. Preferably, the aforementioned lacquer additives are added after the production of the pigment- and/or filler-containing formulation.

Examples of suitable additives are thermally curable reactive diluents, low-boiling and/or high-boiling organic solvents, UV absorbers, light stabilizers, radical scavengers, thermolabile radical initiators, catalysts for the cross-linking, venting means, slip additives, polymerization inhibitors, antifoaming agents, emulsifiers, wetting agents, bonding agents, leveling agents, film-forming additives, rheology-controlling additives, or flame retardants. Other examples of suitable lacquer additives are described in the textbook "Lackadditive" by Johan Bieleman, Wiley-VCH, Weinheim, N.Y., 1998.

Should the aqueous preparations—in particular, coating materials—according to the invention also be curable with actinic radiation (dual cure), they preferably contain additives that are curable with actinic radiation. Actinic radiation may entail electromagnetic radiation, such as near-infrared (NIR), visible light, UV light, or X-rays, or corpuscular radiation, such as electron radiation. Examples of suitable additives that are curable with actinic radiation are disclosed in German patent DE 197 09 467 C1.

Methodologically, the application of the aqueous preparations according to the invention—in particular, the coating materials—does not have any particularities, but rather can take place through all of the common application methods, such as spraying, blade spreading, brushing, pouring, dipping, or rolling, or by means of electrocoating, in particular, cathodic electrocoating.

Substrates that can be used include all surfaces to be lacquered that are not damaged by curing of the lacquer located thereon with the use of heat and optionally the use of actinic radiation; these are, in particular, metals, plastics, wood, ceramic, stone, textiles, fiber composites, leather, glass, glass fibers, glass and rock wool, mineral- and resin-bonded building materials, such as gypsum and cement panels or roof tiles, as well as composites of these materials. Thus, the coating material according to the invention is also suitable for uses beyond automotive painting. Container coating and the impregnation or coating of electrical components are particularly relevant here for the painting of furniture and industrial painting, including coil coating. In the context of industrial painting, it is suitable for painting practically all of the parts for private or industrial use such as radiators, household appliances, small parts made of metal such as screws and nuts, hubcaps, wheels, packaging, or electrical components such as motor windings or transformer windings.

In the case of electrically conductive substrates, the aqueous preparations according to the invention or the coating agent compositions according to the invention may preferably be applied by means of electrocoating, particularly preferably by means of cathodic electrocoating.

Another subject matter of the present invention is therefore an electrocoating composition (also called an electrocoat, for brevity), which comprises the pigment- and/or filler-containing formulations according to the invention. Such an electrocoat composition is particularly suitable for cathodic electrocoating. Another subject matter of the present invention is thus the use of the pigment- and/or filler-containing formulations according to the invention in electrocoat compositions, in particular, cathodically depositable electrocoat compositions.

The electrocoats according to the invention preferably have a solids content of 5 to 50 mass %, preferably 5 to 35 mass %. Here, solids are understood to be the component of an electrocoat that remain after drying at 180° C. for 30 min.

As a binder, the electrocoats according to the invention contain at least the polymers preferably contained as grinding resins in the pigment- and/or filler-containing formulations according to the invention, as well as the emulsifiers (EQ), the state thereof being either free or copolymerized into the polymers. The term "binder" refers herein, in accordance with EN ISO 4618:2006 (German edition), to the non-volatile fraction of a pigment- and/or filler-containing formulation or of a coating agent such as, for example, an electrocoat, less the fillers and pigments included therein.

Preferably, the polymers that are contained in the pigment- and/or filler-containing formulations according to the invention and serve as grinding resins contain reactive functional groups that can undergo thermal cross-linking reactions with the complementary reactive functional groups present in the above-mentioned cross-linking agents. Previously mentioned examples of suitable reactive functional groups are hydroxy groups, thiol groups, and primary and secondary amino groups, in particular, hydroxy groups.

Particularly preferably, the polymers used as grinding resins according to the invention contain at least one type of cationic and/or potentially cationic groups. Potentially cationic groups are, for example, initially uncharged primary, secondary, or tertiary amino groups that can be transformed into ammonium groups by protonation with inorganic or preferably organic acids. Because cathodic electrocoats usually have a pH value of 4.5 to 6.5, which is usually adjusted by adding acids, the pH value of the electrocoats is generally sufficient to convert potentially cationic groups into cationic groups. Examples of suitable acids for the potentially cationic groups are organic and inorganic acids such as sulfuric acid, phosphoric acid, formic acid, acetic acid, lactic acid, propionic acid, α-methylolpropionic acid, dimethylolpropionic acid, γ-hydroxypropionic acid, glycolic acid, tartaric acid, malic acid, citric acid, sugar acids, salicylic acid, 2,4-dihydroxybenzoic acid, or sulfonic acids, such as amidosulfonic acids and alkanesulfonic acids, such as methanesulfonic acid, in particular formic acid, acetic acid, or lactic acid. The use of hydrochloric acid is not preferred, and is precluded in a preferred embodiment.

Other examples of potentially cationic groups that can be converted into cations by neutralizing agents and/or quaternizing agents are secondary sulfide groups or tertiary phosphine groups. Examples of suitable cationic groups are quaternary ammonium groups, tertiary sulfonium groups, or quaternary phosphonium groups, preferably quaternary ammonium groups or tertiary sulfonium groups, but in particular quaternary ammonium groups, such as they occur, in particular, in the emulsifiers (EQ).

In addition to the polymers that are preferably contained as grinding resins, other binders typical for electrocoats may also be contained in the electrocoat according to the invention. Other binders for electrocoats are disclosed in documents EP 0 082 291 A1, EP 0 234 395 A1, EP 0 227 975 A1, EP 0 178 531 A1, EP 0 333 327, EP 0 310 971 A1, EP 0 456 270 A1, U.S. Pat. No. 3,922,253 A, EP 0 261 385 A1, EP 0 245 786 A1, EP 0 414 199 A1, EP 0 476 514 A1, EP 0 817 684 A1, EP 0 639 660 A1, EP 0 595 186 A1, DE 41 26 476 A1, WO 98/33835, DE 33 00 570 A1, DE 37 38 220 A1, DE 35 18 732 A1, or DE 196 18 379 A1. This preferably involves resins that contain primary, secondary, tertiary, or quaternary amino or ammonium groups, and/or tertiary sulfonium groups and have amine numbers between 20 and 250 mg KOH/g and a weight-average molecular weight of 300 to 10000 Dalton. In particular, amino (meth)acrylate resins, amino epoxy resins, aminopolyurethane resins, amino group-containing polybutadiene resins, or modified epoxy resin/carbon dioxide/amine reaction products are used. Very particularly preferred epoxy amine resins are those disclosed in WO-A-2004/007443 and also resins used in the experimental part of the present invention. This may also entail the same polymers that can be used as grinding resins.

Relevant as cross-linking agents are all of the usual and known cross-linking agents that contain suitable complementary reactive functional groups. Preferably, the cross-linking agents are selected from the above-described set of cross-linking agents.

The aqueous preparations according to the invention—in particular, the electrocoats—preferably contain metal compounds in which the metal is present in the form of a cation, very particularly preferably, bismuth compounds. Such metal compounds and, in particular, bismuth compounds are thus very particularly preferably contained when the emulsifiers (EQ) contained according to the invention bear a hydroxy group, thiol group, or primary or secondary amino group in the beta position to the nitrogen atom in the general formula of the emulsifiers (EQ). The aforementioned groups located in the beta position are beneficial for the cross-linking density of the coating. Preferably, the aqueous preparations—in particular, the cathodically depositable electrocoats—contain at least 30 ppm, particularly preferably at least 100 ppm, very particularly preferably at least 200 ppm, and in particular at least 250 ppm bismuth in dissolved form, based on the total weight of the aqueous preparation The content of the dissolved bismuth should preferably not exceed 20000, and particularly preferably not exceed 10000 ppm. In addition or alternatively to the dissolved bismuth, it shall be readily understood that the bismuth pigments set forth above can be used.

Moreover, the aqueous preparations—in particular, the electrocoats—according to the invention contain at least one common and well-known additive, selected from the group of additives described in general terms above, in effective amounts.

The aqueous preparations—in particular, the electrocoats—according to the invention are produced by mixing the aforementioned components. The components may be homogenized. Optionally, the electrocoats according to the invention may be produced with the aid of common and known mixing processing and devices such as stirring vessels, agitator bead mills, extruders, kneaders, Ultra-Turrax apparatuses, Inline dissolvers, static mixers, micromixers, gear rim dispersers, pressure relaxation nozzles, and/or microfluidizers.

The aqueous preparations—in particular, the electrocoats—according to the invention are used, in particular, for cathodic dip coating. The aqueous preparations—in particular, the electrocoats—according to the invention may usually be cathodically deposited on electrically conductive substrates, e.g., substrates that are electrically conductive or made to be conductive, for example, plastic substrates that have been made to be electrically conductive by metallization, or, in particular, metallic substrates.

The invention therefore also relates to a method for cathodically depositing the aqueous preparations—in particular, the electrocoats—according to the invention on such substrates. The method has no methodological particularities. In addition, the electrocoats according to the invention can be used to produce primer coatings by cathodic dip coating of substrates with electrically conductive surfaces.

As metallic substrates, it is possible to use parts made of all of the common metals, for example, the metal parts that are common in the automotive industry, in particular, automotive bodies and parts thereof. Thus, the electrocoats according to the invention can also be used in the painting of vehicles or parts thereof. Very particularly preferred substrates are aluminum substrates. The substrates may be pre-treated by applying a conversion layer—for example, the substrates may be phosphated or chromated. In a preferred embodiment of the invention, the substrates are neither phosphated nor chromated.

In the cathodic deposition of the aqueous compositions, the substrate is dipped in the aqueous composition and connected as a cathode. Preferably, the deposition of the aqueous composition takes place in at least two stages, wherein a voltage in the range of 1 to 50 V is applied in a first stage and a voltage of 50 to 400 V is applied in a second stage, under the condition that in the second stage, the voltage lies at least 10 V above the voltage of the first stage. The voltage is maintained in each stage preferably for at least 10 seconds until at most 300 seconds. Aluminum substrates are preferably used as substrates.

Prior to the curing of the coating, the cathodic deposition may be followed by other treatment stages, such as, for example, rinsing with water and/or ultrafiltrate or, in a particular preferred embodiment of the invention, a so-called sol-gel post-rinsing with a sol-gel composition.

A person skilled in the art will know the terms "sol-gel composition" and "sol-gel", as well as the production of sol-gel compositions and sol-gels, for example, from D. Wang et al., Progress in Organic Coatings 2009, 64, 327-338 oder S. Zheng et al., J. Sol-Gel. Sei. Technol. 2010, 54, 174-187.

An aqueous "sol-gel composition" in the sense of the present invention is preferably understood to be an aqueous composition for the production of which at least one starting compound is reacted with water by hydrolysis and condensation, the starting compound having at least one metal atom and/or semi-metal atom such as, for example, $M^1$ and/or $M^2$ and at least two hydrolyzable groups such as, for example, two hydrolyzable groups $X^1$, and the starting compound optionally further having at least one non-hydrolyzable organic moiety such as, for example, $R^1$. The at least two hydrolyzable groups are preferably each directly bonded by means of a single bond to the at least one metal atom and/or at least one semi-metal atom contained in the at least one starting compound. Due to the presence of the non-hydrolyzable organic moiety, such as, for example, $R^1$, such a sol-gel composition used according to the invention may also be called a "sol-gel-hybrid composition".

Preferably, the aqueous sol-gel composition that can be used according to the invention in the optional sol-gel rinsing step is obtainable by reacting at least one compound $Si(X^1)_3(R^1)$,
  wherein $R^1$ stands therein for a non-hydrolyzable organic moiety comprising at least one reactive functional group selected from the group consisting of primary amino groups, secondary amino groups, epoxy groups, and groups that have an ethylenically unsaturated double bond;
  in particular, at least one compound $Si(X^1)_3(R^1)$, wherein $R^1$ stands therein for a non-hydrolyzable organic moiety that has at least one epoxy group as a reactive functional group, and where $X^1$ stands for a hydrolyzable group such as, for example, an O—$C_{1-6}$ alkyl group, and additionally
  optionally at least one other compound $Si(X^1)_3(R^1)$, wherein $R^1$ stands therein for a non-hydrolyzable organic moiety having at least one reactive functional group selected from the group consisting of primary amino groups and secondary amino groups, and
  where $X^1$ stands for a hydrolyzable group such as, for example, an O—$C_{1-6}$ alkyl group, and optionally at least one compound $Si(X^1)_4$, where $X^1$ stands for a hydrolyzable group such as, for example, an O—$C_{1-6}$ alkyl group,
and optionally at least one compound $Si(X^1)_3(R^1)$,
  wherein $R^1$ stands therein for a non-hydrolyzable organic moiety that has no reactive functional group, such as, for example, a $C_{1-10}$ alkyl moiety, and where $X^1$ stands for a hydrolyzable group such as, for example, an O—$C_{1-6}$ alkyl group,
and optionally at least one compound $Zr(X^1)_4$, where $X^1$ stands for a hydrolyzable group such as, for example, an O—$C_{1-6}$ alkyl group,
with water.

Even the curing of the applied coating materials—in particular, electrocoats—according to the invention has no methodological particularities, but takes place after the common and known thermal methods, such as heating in a convection oven or irradiation with IR rays, which can be added in the case of dual cure through exposure to actinic radiation. Here, it is possible to use radiation sources such as mercury high-pressure or low-pressure steam lamps, which are optionally doped with lead, in order to open a radiation window up to 405 nm, or electron beam sources.

The electrically conductive substrates coated with a cathodic electrocoat layer, which are also a subject matter of the present invention, can be coated with one or more other paint layers such as, for example, one or more filler paint layers, one or more base paint layers, and/or one or more clear coating layers. Such multicoat paint structures are known, in particular, in automotive painting. In other fields, however, it may suffice simply to apply an electrocoat layer according to the invention.

The invention shall be described in greater detail below through examples.

EMBODIMENTS

Unless otherwise specified, information in parts is to be understood to be by weight.

Testing Methods (1) Copper-Accelerated Acetic Acid Salt Spray Test According to DIN EN ISO 9227 CASS (Abbreviated as "CASS Test")

The copper-accelerated acetic acid salt spray test is used to determine the corrosion resistance of a coating on a substrate. The copper-accelerated acetic acid salt spray test is performed according to DIN EN ISO 9227 CASS for the metallic substrate aluminum (AA6014 (ALU)) having been coated with the method according to the invention or with a comparison method. The samples under test will then be in a chamber in which a 5% saline solution having a controlled pH value is continuously atomized at a temperature of 50° C. over a duration of 240 hours, wherein copper chloride and acetic acid are added to the saline solution. The cloud condenses on the samples under test, and coats them with a corrosive salt water film.

The coating of the samples under test is carved with a knife cut reaching the substrate prior to the copper-accelerated acetic acid salt spray test according to DIN EN ISO 9227 CASS, so that the samples can be examined with respect to the degree of infiltration thereof according to DIN EN ISO 4628-8, because the substrate corrodes along the cutting line during the copper-accelerated acetic acid salt spray testing according to DIN EN ISO 9227 CASS. The progressive corrosion process causes the coating to be more or less intensely infiltrated during the test. The degree of infiltration in [mm] is a measure of the resistance of the coating.

(2) Grindometer Value Determination According to DIN 53203

Grindometer blocks and scrapers are visually checked for integrity. The grindometer block is placed on a flat, non-slip surface and wiped clean immediately before the test. Then, the sample, which must be free of air bubbles, is applied to the deepest point of the measurement flume and withdrawn with the scraper in about one second, with slight pressure to the flat end of the flume. The reading must be made within 3 seconds; the grindometer block is then held to the light so that the surface structure of the withdrawn coating film can be carefully studied. Then, the read point on the film can be marked with the finder nail; individual stippling or scoring is ignored. The read point is where the particles originating from the paint film begin to cluster together. The viscosity of the probe to be measured should have an approximately "stringy consistency". Freshly dispersed ground material must cool to room temperature (25° C.) before the measurement. If the cold sample is too viscous, it is diluted with the binder contained in the ground material. A thixotropic material is advantageously stirred up prior to the measurement, with one part non-thixotropic binder and one part solvent. If air bubbles are present in the ground material, then the sample is filtered over a 100 μm sieve. A "25er grindometer" is used for grain sizes of 10 to 20 μm, while a "50er grindometer" is used for 15 to 40 μm, and a "100er grindometer" is used for grain sizes of 25 to 100 μm.

Production of the Emulsifier EQ1:

First of all, a dimethylethanolammonium lactate is produced. This is done by stirring 511.90 parts dimethylethanolamine, 711.9 parts 80% lactic acid, 644.2 parts butyl glycol, and 74.8 parts demineralized water in a reaction vessel equipped with a stirrer and a reflux condenser, for 24 hours.

3057.2 parts Cardolite NC 513 (EEW 532 g/eq) is heated to 60° C. with stirring in a reaction vessel equipped with a stirrer, reflux condenser, temperature sensor, nitrogen inlet, and drip funnel. 1942.8 parts the above dimethylethanolamine lactate is then slowly added dropwise over 30 min. The reaction mixture is then stirred until an MEQ acid value (=milliequivalent acid value) of 0.116 mmol/g is reached.

Production of a Bismuth-Free Pigment Paste P1 with the Emulsifier EQ1

In a stainless steel dissolver container equipped with a cooling jacket, 38.9 parts a conventional grinding resin based on an epoxy prepolymer (CathoGuard® 500 grinding resin, a product sold by the company BASF Coatings GmbH) reacted with amine groups is premixed together with 25.6 parts demineralized water, 0.1 parts phenoxypropanol, and 1.8 parts the emulsifier EQ1 for 15 minutes with a dissolver disc—adapted to the container size—on a dissolver (Firma VME-Getzmann GmbH, model Dispermat® FM10-SIP). Then, 1.5 parts Deuteron MK-F6 (product sold by Deuteron GmBH), 0.5 parts Carbon Black Monarch 120 (product sold by Cabot Corp.), 0.2 parts Lanco PEW 1555 (product sold by Lubrizol Advanced Materials Inc.), 10.7 parts aluminum silicate ASP 200 (product sold by BASF SE), and 30.95 parts titanium dioxide R 900-28 (product sold by E. I. du Pont de Nemours and Company) are added successively, with stirring. The mixture is thereupon predissolved for 10 minutes at about 800 Upm and next ground with a Teflon disc adapted to the container size, with grinding pearls made of zirconium dioxide (Silibeads type ZY, diameter 1.2 to 1.4 mm) and a pearl/ground material ratio of 1/1 (w/w) at 2500 Upm, until a fineness of <12 μm, as measured with a grindometer, is achieved.

Production of a Bismuth-Free Pigment Paste P2 with the Emulsifier EQ1

In a stainless steel dissolver container equipped with a cooling jacket, 38.9 parts a conventional grinding resin based on an epoxy prepolymer (CathoGuard® 500 grinding resin, a product sold by the company BASF Coatings GmbH) reacted with amine groups is premixed together with 19.7 parts demineralized water, 0.1 parts phenoxypropanol, and 5.5 parts the emulsifier EQ1 for 15 minutes with a dissolver disc—adapted to the container size—on a dissolver (Firma VME-Getzmann GmbH, model Dispermat® FM10-SIP). Then, 1.5 parts Deuteron MK-F6 (product sold by Deuteron GmBH), 0.5 parts Carbon Black Monarch 120

(product sold by Cabot Corp.), 0.2 parts Lanco PEW 1555 (product sold by Lubrizol Advanced Materials Inc.), 10.7 parts aluminum silicate ASP 200 (product sold by BASF SE), and 30.95 parts titanium dioxide R 900-28 (product sold by E. I. du Pont de Nemours and Company) are added successively, with stirring. The mixture is thereupon predissolved for 10 minutes at about 800 Upm and next ground with a Teflon disc adapted to the container size, with grinding pearls made of zirconium dioxide (Silibeads type ZY, diameter 1.2 to 1.4 mm) and a pearl/ground material ratio of 1/1 (w/w) at 2500 Upm, until a fineness of <12 µm, as measured with a grindometer, is achieved.

Production of a Bismuth-Free Pigment Paste not According to the Invention

In a stainless steel dissolver container equipped with a cooling jacket, 38.9 parts a conventional grinding resin based on an epoxy prepolymer (CathoGuard® 500 grinding resin, a product sold by the company BASF Coatings GmbH) reacted with amine groups is premixed together with 7.5 parts demineralized water, 0.1 parts phenoxypropanol, and 0.8 parts a wetting and dispersing agent (Disperbyk 1 10, product sold by Byk Chemie GmbH) briefly with a dissolver disc—adapted to the container size—on a dissolver (Firma VME-Getzmann GmbH, model Dispermat® FM10-SIP). Then, 1.5 parts Deuteron MK-F6 (product sold by Deuteron GmBH), 0.5 parts Carbon Black Monarch 120 (product sold by Cabot Corp.), 0.2 parts Lanco PEW 1555 (product sold by Lubrizol Advanced Materials Inc.), 10.7 parts aluminum silicate ASP 200 (product sold by BASF SE), and 30.95 parts titanium dioxide R 900-28 (product sold by E. I. du Pont de Nemours and Company) are added successively, with stirring. The mixture is thereupon predissolved for 10 minutes at about 800 Upm and next ground with a Teflon disc adapted to the container size, with grinding pearls made of zirconium dioxide (Silibeads type ZY, diameter 1.2 to 1.4 mm) and a pearl/ground material ratio of 1/1 (w/w) at 2500 Upm, until a fineness of <12 µm, as measured with a grindometer, is achieved.

Production of Cationic Electrocoating Baths B1, B2 and Comparative Example for Verifying the Corrosion Protection Properties with the Bismuth Complex 2130.0 parts a 40% cationic electrocoat dispersion (CathoGuard® 520, product sold by BASF Coatings GmbH) is mixed with 2400.5 parts demineralized water. Then, 370.0 parts the pigment paste P1 is added with stirring, together with 99.5 parts an aqueous bismuth L(+) lactate solution. The finished bath is stirred for at least 24 hours, before it can be tested.

After the above procedure, additional test baths with the following compositions are produced:

TABLE 1

Composition of the different test baths

|  | B1 | B2 | Comparative example |
|---|---|---|---|
| Demineralized water | 2400.5 | 2408.0 | 2464.5 |
| Binder-Dispersion CathoGuard ® 520 | 2130.0 | 2130.0 | 2130.0 |
| Pigment paste: |  |  |  |
| P1 | 370.0 |  |  |
| P2 |  | 362.5 |  |
| Comparison paste |  |  | 306.0 |
| Bismuth L(+)-lactate 8.0% Bi | 99.5 | 99.5 | 99.5 |

Oiled test sheets from Chemetall of the size 100×200 mm with the designation Gardobond AA 6014 were first cleaned for three minutes in a 60° warm degreasing bath. For this purpose, 30.0 g Ridoline 1565 and 3.0 g Ridosol 1561 (both products from Henkel AG & Co. KGaA) were added to 1 liter of tap water, with stirring. The pH value was adjusted to 11.0. After the degreasing, the sheets were each rinsed for one minute in tap water and then in demineralized water.

Immediately thereafter, a sheet was hung in each of the test baths, and connected as the cathode. A stainless steel anode measuring 30×70 mm was located as an antipole in the bath. In the first step, a voltage of 5 volts was applied directly for one minute. Then, the voltage was raised to 200 volts within 30 seconds. This voltage was held for two minutes. Then, the test sheet was taken out from the bath, and the adhered, non-coagulated lacquer was rinsed off with demineralized water.

The sheet was cross-linked for 30 minutes at 180° C. convection in a commercially-available paint-drying oven of the brand Heraeus.

The selected voltage programs allow for a dry film layer thickness of about 20 µm on the test sheet after the cross-linking. This was determined non-destructively, with a device from Electrophysik, with the trade name Minitest 720.

Corrosion Protection Results:

TABLE 2

CASS results of the embodiments and the comparative example

| CASS according to DIN EN ISO 9225, after 240 hours | B1 | B2 | Comparative example |
|---|---|---|---|
| Delamination at the cut [mm] | 0.9 | 1.5 | 3.4 |
| Blister density [KW] | 2(S2-4) to 1(S2-4) | 1(S2-4) to 0(S0) | 5(S2-5) |

The delamination at the cut and the blister density were determined according to DIN EN ISO 4628-8 and DIN EN ISO 4628-2, respectively.

The invention claimed is:

1. A pigment- and/or filler-containing formulation, comprising one or more solids selected from the group of the pigments and fillers, and at least one emulsifier (EQ), which has the following formula:

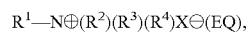

where:
R$^1$ is a moiety that contains at least one aromatic group and at least one aliphatic group, has 15 to 40 carbon atoms, and contains at least one functional group selected from the group consisting of hydroxy groups, thiol groups, primary amino groups, secondary amino groups, at least one carbon-carbon multiple bond, and mixtures thereof; and wherein the moiety R$^1$— has the structure Gr$_{ali1}$-Gr$_{arom}$-Gr$_{ali2}$, where Gr$_{arom}$ stands for an aromatic group and Gr$_{ali1}$ stands for a first aliphatic group and Gr$_{ali2}$ stands for a second aliphatic group and wherein Gr$_{ali1}$ is linear, unsubstituted, and heteroatom-free and has one to three carbon-carbon double bonds, Gr$_{arom}$ is a phenylene or naphthylene group and Gr$_{ali2}$ is linear, bears a hydroxy group in the beta position to the nitrogen atom in the general formula of the emulsifier (EQ) and additionally contains O as a heteroatom, in the form of an ether group;

$R^2$, $R^3$, and $R^4$ are, independently of each other, identical or different aliphatic moieties having 1 to 14 carbon atoms; and $X\ominus$ is an acid anion of an organic or inorganic acid HX.

2. The pigment- and/or filler-containing formulation according to claim 1, wherein the moiety $R^1$ has at least one carbon-carbon multiple bond in the aliphatic group $Gr_{ali1}$.

3. The pigment- and/or filler-containing formulation according to claim 1, wherein the moiety $R^1$ has at least one functional group selected from the group consisting of hydroxy groups, thiol groups, primary amino groups, and secondary amino groups in the aliphatic group $Gr_{ali2}$.

4. The pigment- and/or filler-containing formulation according to claim 3, wherein the moiety $R^1$ has, in the aliphatic group $Gr_{ali2}$, at least one functional group selected from the group consisting of hydroxy groups, thiol groups, primary amino groups, and secondary amino groups in the beta position to the nitrogen atom of the general formula of the emulsifier (EQ) according to claim 1.

5. The pigment- and/or filler-containing formulation according to claim 1, wherein at least two of the moieties $R^1$, $R^2$, $R^3$, and $R^4$ bear a functional group selected from the group consisting of hydroxy groups, thiol groups, primary amino groups, and secondary amino groups.

6. The pigment- and/or filler-containing formulation according to claim 5, wherein in addition to bearing at least one of the hydroxy groups, thiol groups, primary amino groups and secondary amino groups, the moieties $R^2$, $R^3$, and/or $R^4$ bear at least one other functional group selected from ether groups, ester groups, and amide groups.

7. The pigment- and/or filler-containing formulation according to claim 1, wherein $X\ominus$ is the acid anion of an acid HX that is selected from the group of non-hydroxy-functional carboxylic acids and monohydroxy-functional carboxylic acids.

8. The pigment- and/or filler-containing formulation according to claim 1, wherein a mixture of different emulsifiers (EQ) is used, in which more than 50 mol % of the moiety $R^1$ contains carbon-carbon multiple bonds.

9. The pigment- and/or filler-containing formulation according to claim 1 further comprising a polymer selected from the group of a polymerization polymer, a polycondensation polymer, and a polyaddition polymer.

10. The pigment- and/or filler-containing formulation according to claim 9, wherein the polymer is an epoxy-amine adduct or an acrylic resin.

11. The pigment- and/or filler-containing formulation according to claim 1, further comprising a cross-linking agent selected from the group consisting of blocked polyisocyanates, aminoplast resins, and tris(alkoxycarbonylamino) triazines.

12. An aqueous preparation comprising a pigment- and/or filler-containing formulation according to claim 1.

13. The aqueous preparation according to claim 12, containing at least one resin system curable thermally or by exposure to radiation.

14. The aqueous preparation according to claim 13, wherein the aqueous preparation is a cathodically depositable electrocoat composition.

15. The aqueous preparation according to claim 14, comprising a cross-linking catalyst.

16. The aqueous preparation according to claim 12, wherein the aqueous preparation contains at least 30 ppm bismuth in a dissolved form, relative to the total preparation.

17. The aqueous preparation according to claim 12 cathodically electrocoated onto a metal substrate.

18. The aqueous preparation according to claim 17, wherein the metal substrate is an aluminum substrate.

19. A method for cathodically electrocoating electrically conductive substrates, wherein an aqueous composition according to claim 12 is used as an electrocoat onto an electrically conductive substrate.

20. The method according to claim 19, wherein the electrocoat is deposited in two stages, and, in the first stage, a voltage in the range of 10 to 50 V is applied, and in the second stage, a voltage in the range of 50 to 400 V is applied, under the condition that the voltage in the second stage is at least 10 V higher than the voltage applied in the first stage, and that the voltage in each of the two stages is maintained in the relevant range for at least 10 seconds.

21. An electrically conductive substrate, coated according to the method of claim 19.

22. The electrically conductive substrate according to claim 21, wherein the electrically conductive substrate is a metallic substrate.

23. The electrically conductive substrate according to claim 22, wherein the metallic substrate is an aluminum substrate.

24. The electrically conductive substrate according to claim 21, wherein the coating is hardened.

25. The electrically conductive substrate according to claim 21, wherein the substrate is an automobile body or a part thereof.

26. Use of an emulsifier (EQ) having the following formula:

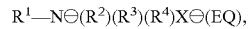

where:

$R^1$ is a moiety that contains at least one aromatic group and at least one aliphatic group, has 15 to 40 carbon atoms, and contains at least one functional group selected from the group consisting of hydroxy groups, thiol groups, primary amino groups, secondary amino groups, at least one carbon-carbon multiple bond, and mixtures thereof; and wherein the moiety $R^1$— has the structure $Gr_{ali1}$-$Gr_{arom}$-$Gr_{ali2}$, where $Gr_{arom}$ stands for an aromatic group and $Gr_{ali1}$ stands for a first aliphatic group and $Gr_{ali2}$ stands for a second aliphatic group and wherein $Gr_{ali1}$ is linear, unsubstituted, and heteroatom-free and has one to three carbon-carbon double bonds, $Gr_{arom}$ is a phenylene or naphthylene group and $Gr_{ali2}$ is linear, bears a hydroxy group in the beta position to the nitrogen atom in the general formula of the emulsifier (EQ) and additionally contains O as a heteroatom, in the form of an ether group;

$R^2$, $R^3$, and $R^4$ are, independently of each other, identical or different aliphatic moieties having 1 to 14 carbon atoms; and $X\ominus$ is an acid anion of an organic or inorganic acid HX, in combination with a pigment and/or filler to produce a pigment- and/or filler-containing formulation.

27. An aqueous preparation comprising a pigment- and/or filler-containing formulation, comprising one or more solids selected from the group of the pigments and fillers, and at least one emulsifier (EQ), which has the following formula:

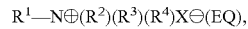

where:

$R^1$ is a moiety that contains at least one aromatic group and at least one aliphatic group, has 15 to 40 carbon atoms, and contains at least one functional group selected from the group consisting of hydroxy groups, thiol groups, primary amino groups, secondary amino groups, at least one carbon-carbon multiple bond, and mixtures thereof;

$R^2$, $R^3$, and $R^4$ are, independently of each other, identical or different aliphatic moieties having 1 to 14 carbon atoms;

$X^\ominus$ is an acid anion of an organic or inorganic acid HX;

said aqueous preparation containing at least one resin system curable thermally or by exposure to radiation; and wherein said aqueous preparation is a cathodically depositable electrocoat composition.

* * * * *